Aug. 19, 1924.
M. L. FLICKINGER
WINDSHIELD THERMOMETER
Filed March 31, 1922    2 Sheets-Sheet 2
1,505,383
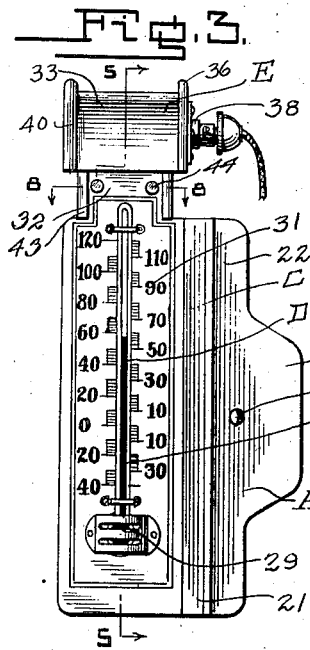
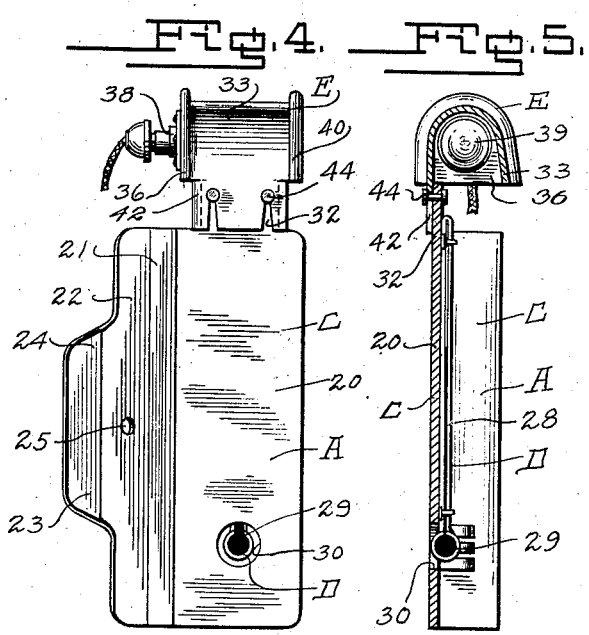
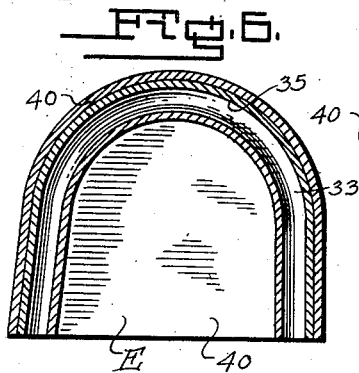
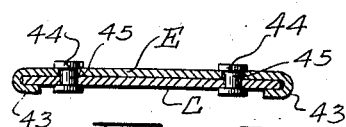
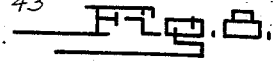
Maynard L. Flickinger, Inventor
By Lancaster and Allwine, Attorneys Patented Aug. 19, 1924.

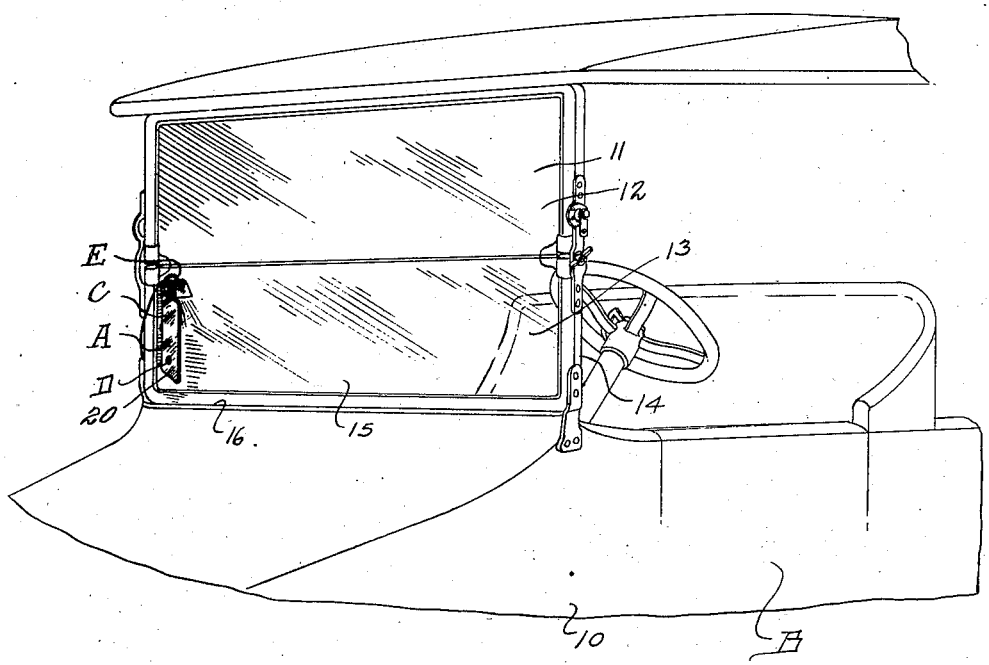
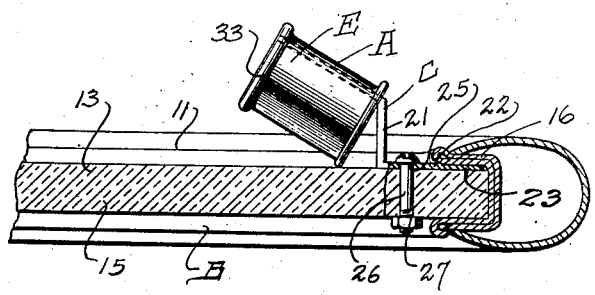

1,505,383

UNITED STATES PATENT OFFICE.

MAYNARD L. FLICKINGER, OF BOSTON, MASSACHUSETTS.

WINDSHIELD THERMOMETER.

Application filed March 31, 1922. Serial No. 548,493.

*To all whom it may concern:*

Be it known that I, MAYNARD L. FLICKINGER, a citizen of the United States, residing at Boston, in the county of Suffolk and State of Massachusetts, have invented certain new and useful Improvements in Windshield Thermometers, of which the following is a specification.

This invention relates to automotive vehicle attachments and the primary object of the invention is the provision of means for incorporating a thermometer with the windshield of an automobile, so that the driver of a vehicle can accurately determine changes in temperature, thereby allowing him to regulate the amount of air passing through the radiator to cool the engine and the correct firing mixture to use for the engine.

Another object of the invention is the provision of novel means for mounting a thermometer on a windshield so that the same can be quickly and securely placed in position and so that the themometer can be readily seen from the driver's seat of the vehicle.

A further object of the invention is the provision of novel means for mounting a lamp and reflector on the frame of the thermometer, so that the thermometer can be easily read at night, the reflector being detachably mounted on the frame of the thermometer so that the same can be readily and quickly removed thereform when so desired.

A further object of the invention is the provision of novel means for making the reflector, so that certain parts thereof can be readily removed, in order to permit the convenient placing and removing of the bulb from its socket, carried by the reflector.

A still further object of the invention is the provision of an improved thermometer for motor vehicles, of the above character, which will be durable and efficient in use, one that will be simple and easy to manufacture and one which can be incorporated with a windshield at a minimum cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a fragmentary perspective view of a motor vehicle, showing the improved thermometer incorporated therewith.

Figure 2 is an enlarged horizontal section through a fragment of a windshield of a motor vehicle, showing the improved thermometer incorporated therewith, the novel thermometer being shown partly in plan and partly in section.

Figure 3 is a side elevation of the improved wind shield thermometer.

Figure 4 is a rear elevation of the same.

Figure 5 is a vertical central section through the improved windshield thermometer, taken on the line 5—5 of Figure 3.

Figure 6 is an enlarged section through the reflector for the thermometer, taken on the line 6—6 of Figure 7.

Figure 7 is an enlarged vertical longitudinal section through the reflector of the improved wind shield thermometer, and Figure 8 is a detail horizontal transverse section through the improved windshield thermometer taken on the line 8—8 of Figure 3, showing the means of detachably connecting the reflector with the frame of the thermometer.

Referring to the drawings in detail, wherein similar reference characters designate corresponding parts throughout the several views, the letter A generally indicates the improved wind shield thermometer; and B, an automobile with which it can be associated.

The vehicle B can be, of course, of any construction, and has been merely shown for illustrating the use of the improved thermometer.

The vehicle B, includes the body 10, the wind shield 11, which as shown includes the upper and lower sections 12 and 13 supported by the side windshield standards 14. Each of the windishield sections 12 and 13 include the transparent panels 15 and retaining frames 16 therefor.

The improved windshield thermometer A includes a supporting body C for the thermometer D and the light reflector E.

The supporting body C for the thermometer tube D can be formed of any desired material, such as sheet metal of the preferred gage, and this supporting body C includes the rectangular body plate 20 having one edge thereof provided with an angularly related flange 21, which in turn is provided with a right angularly disposed attaching foot 22. This attaching foot 22 is adapted to be placed in abutting relation to the outer surface of the windshield glass 15 and if so desired, the outer edge of the attaching foot 22 can be provided with an inserting tongue 23, which can be scarfed or reduced in thickness as at 24. This tongue 23 is adapted to be inserted between the outer face of the glass 15 and the frame 16 for the glass, as clearly shown in Figure 2 of the drawings. This will effectively hold the body C in position, but if so desired, the supporting foot 22, and the glass 15 can be bored or drilled to provide aligned openings 25 and 26, for the reception of a retaining bolt 27. This is also clearly shown in Figure 2 of the drawings.

Now, it is preferred that the improved thermometer attachment A be associated with the lower section 13 of the windshield 11 and arranged at the right hand side thereof so that the same will not interfere with the sight of the driver of the vehicle. Owing to the fact, however, that the body plate 20 is disposed at an obtuse angle to the flange 21, it is obvious that the thermometer D will be disposed at an angle to the path of the vehicle and thus be in line with the sight of the driver when he looks to the right.

The thermometer D is, of course, of the ordinary or any preferred construction, and includes the usual tubular body 28 and the bulb 29. This thermometer D can be held in place on the body plate 20 by any well known means and the body plate 20 adjacent to its lower end is provided with an enlarged opening 30, which permits the free circulation of air around the bulb portion 29 of the thermometer D, so that a true reading of the temperature can be had when the vehicle is in motion. A suitable dial or indicating plate 31 is mounted upon the body plate 20 and this plate can be graduated to any preferred scale, such as from zero or freezing point up to summer temperature, that is, about 98°. As shown, the plate is provided with a Fahrenheit scale and is graduated to indicate the temperature from 40° below zero to 120° above zero.

If desired, suitable advertising matter can be placed upon the supporting body C such as the name of the house placing the thermometers on the market.

By this construction, it is obvious that the driver of the vehicle can, at all times, tell the exact temperature while driving, and thereby permit him to regulate the amount of air passing through the radiator necessary to cool the same, and regulate the portions of the firing charge which is best suited for different temperatures.

If desired, the supporting body C may have associated therewith, the light deflector E, so that the thermometer can be readily read at night time, and when the supporting body C is to have the light deflector E associated therewith, the upper edge of the plate 20 can be provided with an upwardly extending supporting lug 32. This lug 32 merely forms a continuation of the plate 20.

The reflector E as shown, consists of the semi-cylindrical body 33, the ends of which can be respectively provided with a retaining flange 34 and the guide or retaining flange 35. An end wall 36 is fitted about the retaining flange 34 and this wall can be provided with means 37 for supporting a socket 38 for the lamp 39. The guide and retaining flange 35 forms means for slidably forming the removable end wall 40, which is provided for the purpose of facilitating the placing and removing of the lamp 39 from its socket 38. One lower edge of the reflector E is provided with a depending supporting lug 42, and the side edges of this lug 42 can be provided with bent back guide flanges 43 for engaging about the side edges of the upstanding supporting lug 32. This supporting lug 32 can be provided with headed retaining pins 44 and the depending lug 42 has inwardly extending passageways 45 for the reception of said headed pins and these passageways terminate in openings 46 in which the pins are adapted to rest. It is obvious that when the reflector is associated with the supporting body C, that the light rays from the bulb 39 will be directed on the scale plate 31 and the thermometer D and thereby permit the easy reading of the thermometer. If desired, the switch for the lamp 39 can be attached at a convenient point on the instrument board of the vehicle with which the improved thermometer attachment is associated.

It is of course, obvious that the improved thermometer attachment will function just as well without the reflector and lamp 39 as heretobefore stated.

Changes in details may be made without departing from the spirit and scope of this invention; but,

I claim:

1. As a new article of manufacture, an attachment of the class described including a substantially rectangular body plate, an angularly related flange formed on one end of the plate, a supporting foot formed on the flange and disposed at right angles thereto, an inserting tongue formed on the foot having a less width than the attaching foot said flange having an opening therethrough.

2. As a new article of manufacture, a thermometer attachment comprising a supporting body including a plate, an angularly disposed flange formed on one side of the plate, a supporting foot formed on one edge of the flange and disposed at substantially right angles to the plane, a tongue formed on the foot having a width less than the attaching foot, a thermometer including a tube and bulb, and means for connecting the tube and bulb to the plate, the plate having an opening formed therein for permitting the free circulation of air around said bulb.

3. In a thermometer attachment, the combination with a thermometer including a tube and a bulb; of a supporting body including an upright elongated plate provided with a perforation adjacent its lower end portion, a flange extending from one upright margin of the plate and in angular relation to the plane of the plate so as to extend at one face thereof and an attaching foot carried by said flange at an angle thereto whereby the supporting body may be secured adjacent a pane of glass with said plate in a plane at an acute angle to the pane of glass; and means attaching said thermometer to said plate at the face of the plane thereof to which said flange extends and with the bulb of the thermometer at said opening in the plate whereby air currents may circulate through the plate and around said bulb.

4. In a thermometer attachment, the combination with a thermometer including a tube and a bulb; of a supporting body including an upright elongated plate provided with a perforation adjacent its lower end portion, means for attaching said plate adjacent a pane of glass with the plate at an acute angle thereto; and means attaching said thermometer to one face of said plate with the bulb of the thermometer at said opening in the plate, substantially as and for the purpose set forth.

MAYNARD L. FLICKINGER.